(12) United States Patent
King (10) Patent No.: US 6,857,220 B2
(45) Date of Patent: Feb. 22, 2005

(54) FLEXIBLE FISHING LURE TAILS AND APPENDAGES

(76) Inventor: Bobby D. King, 208 S. 38th St., Mesa, AZ (US) 85206

( * ) Notice: Subject to any disclaimer, the term of this patent is extended or adjusted under 35 U.S.C. 154(b) by 0 days.

(21) Appl. No.: 10/175,561

(22) Filed: Jun. 18, 2002

(65) Prior Publication Data

US 2002/0194770 A1 Dec. 26, 2002

Related U.S. Application Data

(60) Provisional application No. 60/299,468, filed on Jun. 21, 2001.

(51) Int. Cl.$^7$ ............................................... A01K 85/00
(52) U.S. Cl. ...................................... 43/42.28; 43/42.24
(58) Field of Search ............................. 43/42.03, 42.24, 43/42.28, 42.29, 42.37, 42.45, 42.15, 42.06

(56) References Cited

U.S. PATENT DOCUMENTS

| | | | | |
|---|---|---|---|---|
| 2,150,846 A | * | 3/1939 | Rayburn ..................... | 43/42.03 |
| 2,847,791 A | * | 8/1958 | Simmons ..................... | 43/42.26 |
| 2,994,982 A | | 8/1961 | Murawski ..................... | 43/35 |
| 3,218,750 A | * | 11/1965 | Lewin ..................... | 43/42.28 |
| 3,445,953 A | | 5/1969 | Dailey ..................... | 43/42.06 |
| 3,585,749 A | | 6/1971 | Dieckmann ..................... | 43/42.03 |
| 3,748,774 A | | 7/1973 | Bryant ..................... | 43/42.1 |
| 3,861,073 A | * | 1/1975 | Thomassin ..................... | 43/42.24 |
| 3,879,882 A | | 4/1975 | Rask ..................... | 43/42.28 |
| 3,883,979 A | | 5/1975 | Williams, Jr. ..................... | 43/42.09 |
| 4,044,492 A | * | 8/1977 | Ingram ..................... | 43/42.28 |
| 4,069,610 A | * | 1/1978 | Firmin ..................... | 43/42.24 |
| 4,074,455 A | | 2/1978 | Williams, Jr. ..................... | 43/42.06 |
| 4,317,305 A | * | 3/1982 | Firmin ..................... | 43/42.28 |
| 4,581,841 A | | 4/1986 | Gish ..................... | 43/26.2 |
| 4,869,012 A | | 9/1989 | Brenholt ..................... | 43/42.1 |
| 5,088,226 A | | 2/1992 | Bazinet ..................... | 43/42.03 |
| 5,193,299 A | | 3/1993 | Correll et al. ..................... | 43/42.47 |
| 5,456,039 A | | 10/1995 | Pisoni et al. ..................... | 43/42.24 |
| 5,522,170 A | * | 6/1996 | Cole ..................... | 43/42.15 |
| 5,678,350 A | * | 10/1997 | Moore ..................... | 43/42.15 |
| 6,141,900 A | | 11/2000 | Rudolph ..................... | 43/42.47 |
| 6,164,006 A | | 12/2000 | Peterson ..................... | 43/42.09 |
| 6,385,896 B1 | * | 5/2002 | Thomassin ..................... | 43/42.03 |
| 6,393,755 B1 | * | 5/2002 | Weaver ..................... | 43/42.03 |
| 6,446,381 B1 | * | 9/2002 | Firmin ..................... | 43/42.24 |
| 6,460,286 B1 | * | 10/2002 | Wilson ..................... | 43/42.03 |

* cited by examiner

Primary Examiner—Darren W. Ark
(74) Attorney, Agent, or Firm—John M. Harrison (57) ABSTRACT

Flexible fishing lure tails and appendages having extending or projecting shoulder surfaces to facilitate a simulated swimming action by the drag and eddy principle of water flow. One or more shoulders are provided in the surfaces of the flexible fishing lure tails to facilitate the swimming action as the lure to which the tail or appendage is attached is retrieved through a water body. This swimming action due to the vibration of the tail and appendage segment and the body of the fishing lure is unique and simulates live lizards, worms, crawfish, grubs, minnows and the like, a primary characteristic that attracts fish. The tail and appendage segments can be removably or permanently fixed to both hard and soft body lures or molded in combination with a lure body of selected length, size, color and plastic composition characteristics to facilitate the desired swimming action and vibration and thus the attraction to game fish of every variety.

2 Claims, 7 Drawing Sheets

FLEXIBLE FISHING LURE TAILS AND APPENDAGES

CROSS-REFERENCE TO RELATED APPLICATIONS

This application claims the benefit of prior filed copending U.S. Provisional Application Ser. No. 60/299,468, filed Jun. 21, 2001.

BACKGROUND OF THE INVENTION

Field of the Invention

This invention relates to fishing lures and more particularly, to soft plastic fishing lures and hard body fishing lures having tail portions and appendages fitted with projecting or extending shoulder segments that create a drag and eddy effect and simulate a swimming action as the lure is retrieved through a water body. This drag and eddy effect causes the tail and appendage portion of the lure to move back and forth and vibrate, which vibrates the body segment, responsive to a selected retrieval speed to attract fish.

One of the most effective lures in taking game fish, including game fish of the fresh water variety such as large mouth and small mouth bass, crappie and the like, as well as salt water varieties, including red fish, speckled trout and other fish, is the plastic lure, which can be molded into substantially any desired size, shape and consistency. Typical of these conventional plastic lures is a tail portion that has a rounded or ribbon shape and is connected to or integrally formed with the body portion at a narrowed area to facilitate a simulated swimming action when the lure is retrieved. These plastic lures are typically used with bare and weighted hooks, jig heads, spinner bait harnesses and other hook arrangements known to those skilled in the art to further facilitate the swimming action and to allow the lure to be fished at a variety of depths and retrieval speed in a water body. The plastic lures can be molded into worm configurations having beads or segments which can then be attached to a jig head, for example, and fished on the bottom of a water body as the lead or metal portion of the jig head causes the entire lure to sink, to facilitate bouncing the lure off the bottom in a swimming or crawling simulation. Typical of these lures are the lures detailed in the following patents: U.S. Pat. No. 2,994,982, issued Aug. 8, 1961, to S. A. Murawski; U.S. Pat. No. 3,445,953, issued May 27, 1969, to J. J. Dailey; U.S. Pat. No. 3,585,749, issued Jun. 22, 1971, to Edward R. Dieckmann; U.S. Pat. No. 3,748,774, issued Jul. 31, 1973, to Sherman G. Bryant; U.S. Pat. No. 3,879,882, issued Apr. 29, 1975, to Oscar J. Rask; U.S. Pat. No. 3,883,979, issued May 20, 1975, to William O. Williams, Jr.; U.S. Pat. No. 4,074,455, issued Feb. 21, 1978, to William O. Williams, Jr.; U.S. Pat. No. 4,581,841, dated Apr. 15, 1986, to Joseph C. Gish; U.S. Pat. No. 4,869,012, dated Sep. 26, 1989, to David L. Brenholt; U.S. Pat. No. 5,088,226, dated Feb. 18, 1992, to Norman L. Bazinet; U.S. Pat. No. 5,193,299, dated Mar. 16, 1993, to Robert P. Correll; U.S. Pat. No. 5,456,039, dated Oct. 10, 1995, to Henry F. Pisoni, et al; U.S. Pat. No. 6,141,900, dated Nov. 7, 2000, to John A. Rudolph; and U.S. Pat. No. 6,164,006, dated Dec. 26, 2000, to Lyle M. Peterson;

It is an object of this invention to provide new and improved flexible fishing lure tails and appendages for various types of fishing lures, which tail portions and appendages are designed to vibrate and simulate a life-like swimming action and generate a vibration and life-like swimming action in the body portion when the lure is retrieved through a water body.

Another object of this invention is to provide new and improved flexible tail portions and appendages for various types of solid and flexible plastic fishing lures, which tail portions and appendages may either be molded integrally with the body portions of the lure or attached to the body portions, and are fitted with shoulder segments or projections to facilitate vibration and a life-like swimming action in both the tail and, by energy transmission, in the body portions, when the lures are retrieved at various speeds through a water body.

Yet another object of this invention is to provide a new and improved, flexible plastic fishing lure tail and appendage system which is characterized by shoulder projections near the terminal resilient tail portion and appendage segment of the lures, to create a drag and eddy condition when the tail or appendage is attached or molded integrally with a fishing lure body of selected size, shape and design and is retrieved through a water body, to facilitate a life-like swimming motion of the entire fishing lure.

Still another object of this invention is to provide flexible plastic fishing lures, including flexible, resilient and typically forked or blocked tail and appendage portions or segments, that incorporate a raised projection or shoulder to facilitate a tail vibration and an induced body vibration that is proportional to the speed of lure retrieval, and a life-like swimming action through the water based on the drag and eddy principle, as the lure is retrieved through the water body.

Yet another object of this invention is to provide a new and improved soft, flexible plastic fishing lure tail and appendage design which may be of any desired thickness and typically forked or blocked and incorporated in a plastic lure or a hard body lure of substantially any design, shape and size to simulate a life-like swimming action and facilitate a vibration of the tail and appendage portion as well as the body portion, responsive to retrieval of the lure through the water, the magnitude of which vibration and energy transmission to the body depends upon the tail and appendage design and the speed of retrieval of the lure.

A still further object of this invention is to provide new and improved tail portions of selected thickness and size which can be used on flexible and resilient plastic or hard body artificial lures such as lizards, worms, crawfish, grubs, minnows, tube baits, jig trailers and the like, of any desired size, color, shape and design, which tail portions include a projecting shoulder or edge of selected size on each side of the tail that cause a drag and eddy effect to create a vibration in the tail and body portions of the lure, which vibration simulates a natural swimming action, the intensity and energy of which vibration is transmitted to the lure body and is controlled by the speed of retrieval of the lure through a water body.

Another object of the invention is to provide a method for vibrating the tail and body of a fishing lure having at least a flexible tail extending from the body, which method includes providing a shoulder on the tail for vibrating the tail and the body when the lure is retrieved.

SUMMARY OF THE INVENTION

These and other objects of the invention are provided in new and improved soft plastic or hard body fishing lures and lure tails and appendages of any desired design, size, color and configuration, and a method for inducing vibration in the lure bodies, tails and appendages, the bodies of which fishing lures incorporate flexible and resilient tail portions of selected size and thickness, fitted with projecting shoulders, projections or enlargements of selected size that are typically forked or blocked and which react to water pressure according to the drag and eddy principle and undulate and "swim" through the water during retrieval with a vibration that is imparted from the tail to the body portion, the intensity of which vibration is directly proportional to the speed of retrieval of the lure through the water and the tail design.

DESCRIPTION OF THE DRAWINGS

The invention will be better understood by reference to the accompanying drawings wherein.

DESCRIPTION OF THE PREFERRED EMBODIMENTS

Figure 1:
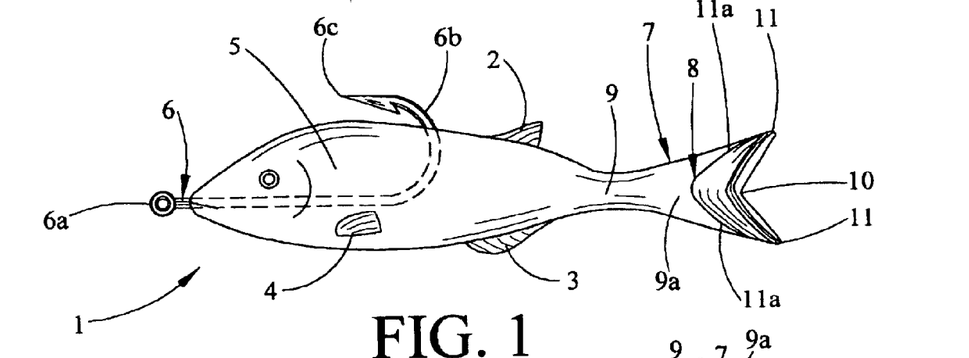
FIG. 1 is a side view of a typical forked tail lure of this invention, having a forked tail portion.
Figure 2:
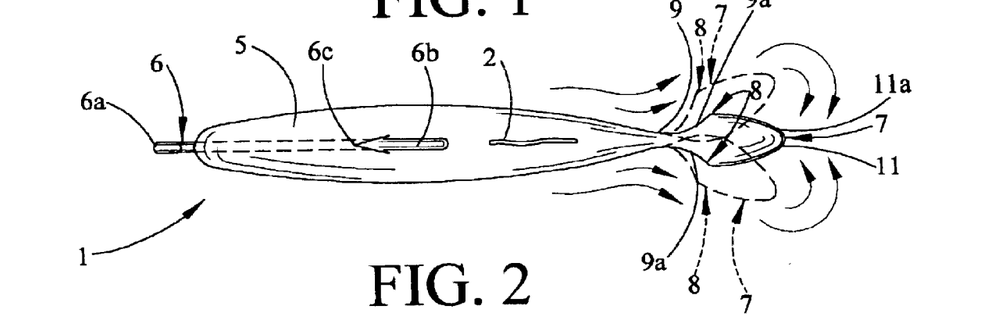
FIG. 2 is a top view of the forked tail lure illustrated in FIG. 1, more particularly illustrating the swimming and vibrating motion of the forked tail portion during lure retrieval.
Figure 3:
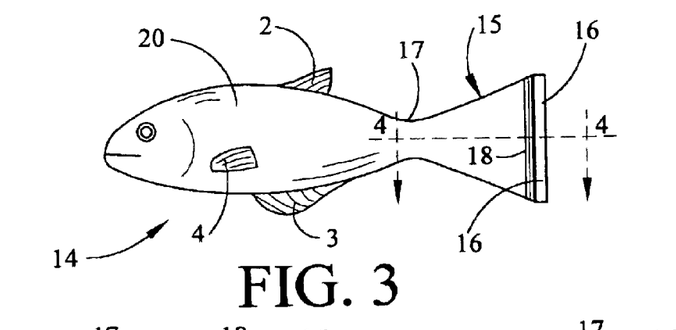
FIG. 3 is a side view of a block tail lure of this invention, having a block tail portion.
Figure 4:
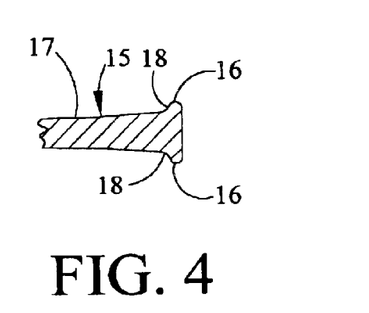
FIG. 4 is a sectional view taken along line 4—4 of the block tail lure illustrated in FIG. 3, more particularly illustrating an illustrative neck, neck extension and shoulder of the block tail portion.
Figure 5:
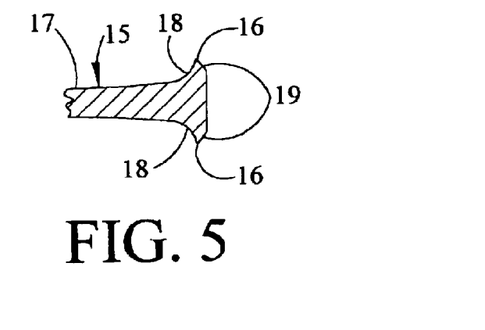
FIG. 5 is a sectional view taken along line 4—4 of the block tail lure illustrated in FIG. 3, more particularly illustrating an alternative neck extension and shoulder configuration for the block tail portion.
Figure 6:
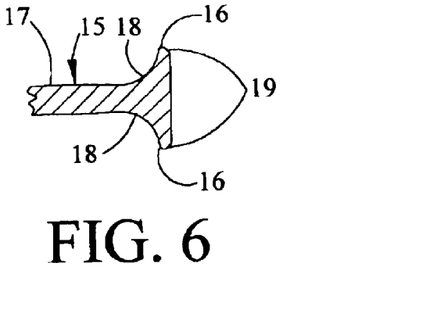
FIG. 6 is a sectional view taken along line 4—4 of the block tail lure illustrated in FIG. 3, more particularly illustrating yet another illustrative configuration of the neck extension and shoulder components of the block tail portion thereof.
Figure 7:
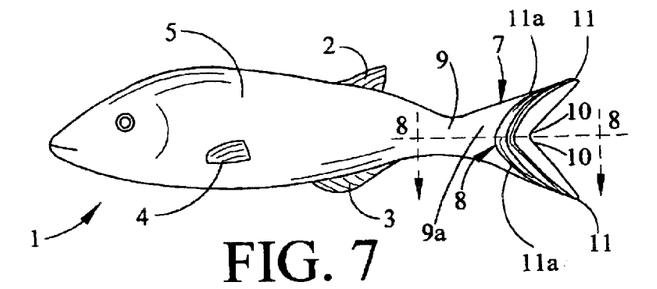
FIG. 7 is a side view of the forked tail lure illustrated in FIG. 1, more particularly illustrating yet another design for the forked tail portion thereof.

Referring initially to FIGS. 1 and 2 of the drawings, in a first embodiment of the invention a forked tail lure is generally illustrated by reference numeral 1. The forked tail lure 1 is typically characterized by a soft, resilient, flexible, typically plastic forked tail lure body 5 shaped generally in the configuration of a minnow or small bait fish of selected size and color and having a simulated caudal fin 2, an anal fin 3 and a pectoral fin 4 on the forked tail lure body 5. A hook 6 includes a hook shank 6b which is embedded in the forked tail lure body 5 as illustrated, with the hook point 6c projecting from the forked tail lure body 5 forwardly of the caudal fin 2, as illustrated and a hook eye 6a on the opposite, forward-protruding end of the hook shank 6b for attachment to a fishing line (not illustrated). In a typical retrieval, the line of a rod and reel combination (not illustrated) is attached to the hook eye 6a and the forked tail lure 1 then retrieved through a water body at a selected speed, in conventional fashion.

A forked tail portion 7 is typically integrally molded with the forked tail lure body 5 and extends from the forked tail lure body 5 at a forked tail neck 9 of selected thickness and proportions. A forked tail projection or shoulder 8 extends along both sides of the forked tail portion 7 transverse to the longitudinal axis of the forked tail lure 1 and is convex in shape throughout its entirety and protrudes outwardly in a lateral direction from the longitudinal axis of the forked tail lure 1. On each side of the forked tail portion 7, the forked tail shoulder 8 defines the boundary between the rear curved margin of a neck extension or appendage 9a of the tail neck 9 and the complementary front curved margin of a concave tail fork 10. The forked tail shoulder 8 extends rearwardly along a pair of fork extension curvatures 11a to define a pair of fork extensions 11, divided at the tail fork 10, as further illustrated in FIG. 2.

Figure 8:
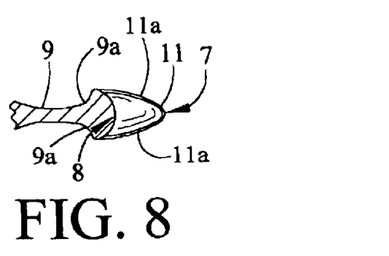
FIG. 8 is a sectional view taken along line 8—8 of the forked tail lure illustrated in FIG. 7, more particularly illustrating thin fork tail neck, neck extension and fork extension configurations for the forked tail portion.
Figure 9:
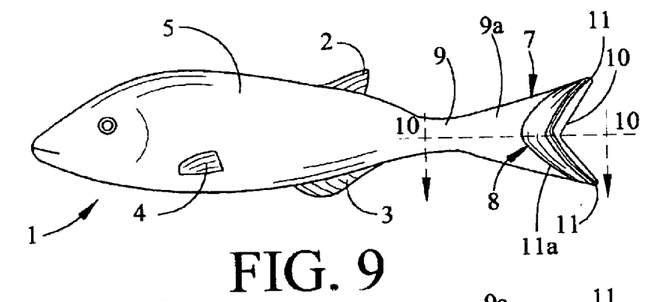
FIG. 9 is a side view of yet another embodiment of the forked tail lure illustrated in FIGS. 1 and 7, more particularly illustrating an alternative thicker fork tail neck design for the forked tail portion, wherein the forked tail neck is of intermediate thickness.
Figure 10:
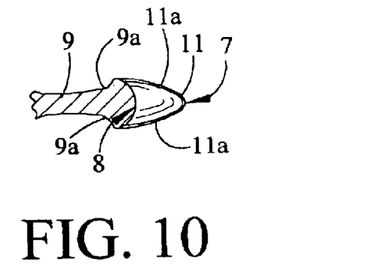
FIG. 10 is a sectional view taken along line 10—10 of the forked tail lure illustrated in FIG. 9, more particularly illustrating the intermediate fork tail neck thickness.
Figure 11:
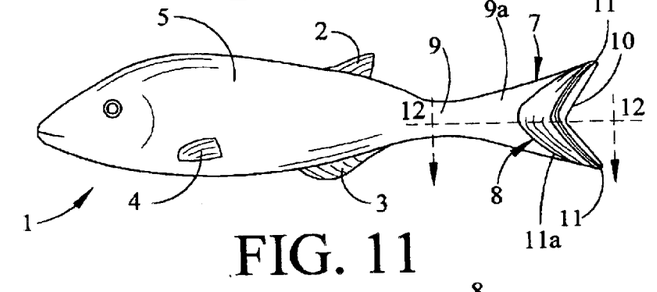
FIG. 11 is a side view of yet another embodiment of the forked tail lure illustrated in FIGS. 1, 7 and 9, more particularly illustrating a forked tail neck which is thicker in construction than the forked tail neck illustrated in FIGS. 8 and 10.
Figure 12:
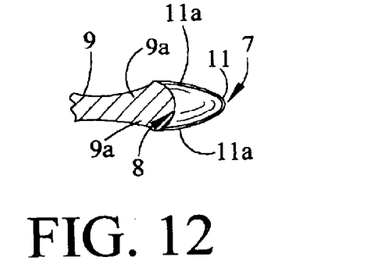
FIG. 12 is a sectional view taken along line 12—12 of the forked tail lure illustrated in FIG. 11, more particularly illustrating an increased thickness of the forked tail neck.
Figure 13:
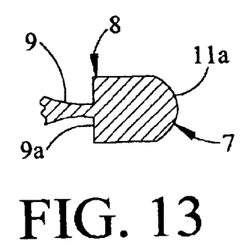
FIG. 13 is a sectional view taken along line 12—12 of the forked tail lure illustrated in FIG. 11, more particularly illustrating an alternative configuration for the fork tail shoulder, neck extension and fork extension elements of the forked tail portion.
Figure 14:
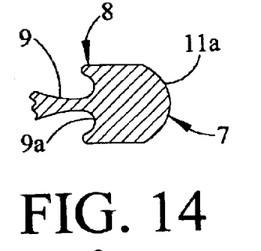
FIG. 14 is a sectional view taken along line 12—12 of the forked tail lure illustrated in FIG. 11, illustrating still another preferred embodiment of the fork tail shoulder, neck extension and fork extension of the forked tail portion.
Figure 15:
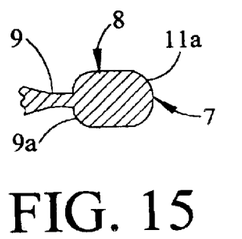
FIG. 15 is a sectional view taken along line 12—12 of the forked tail lure illustrated in FIG. 11, more particularly illustrating yet another configuration for the fork tail shoulder, neck extension and fork extension of the forked tail portion.
Figure 16:
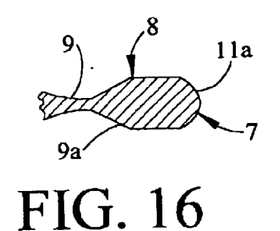
FIG. 16 is a sectional view taken along line 12—12 of the forked tail lure illustrated in FIG. 11, more particularly illustrating an alternative configuration for the fork tail shoulder, neck extension, and fork extension of the forked tail portion.
Figure 17:
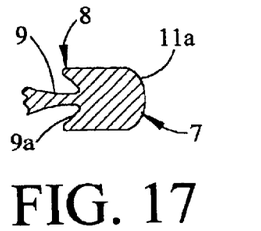
FIG. 17 is a sectional view taken along line 12—12 of the forked tail lure illustrated in FIG. 11, more particularly illustrating a still further alternative configuration for the fork tail shoulder, neck extension and fork extension of the forked tail portion.
Figure 18:
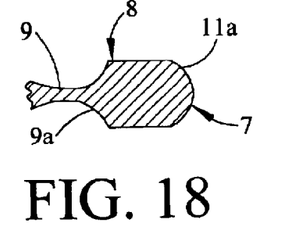
FIG. 18 is a sectional view taken along line 12—12 of the forked tail lure illustrated in FIG. 11, more particularly illustrating yet another alternative configuration for the fork tail shoulder, neck extension and fork extension of the forked tail portion.
Figure 19:
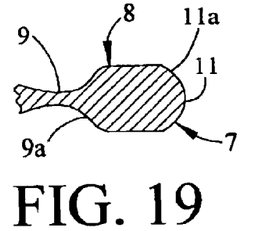
FIG. 19 is a sectional view taken along line 12—12 of the forked tail lure illustrated in FIG. 11 illustrating yet another alternative configuration for the fork tail shoulder, neck extension and fork extension of the forked tail portion.
Figure 20:
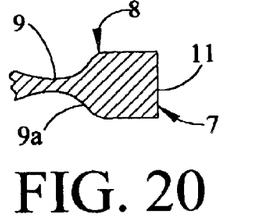
FIG. 20 is a sectional view taken along line 12—12 of the forked tail lure illustrated in FIG. 11 illustrating still another alternative configuration for the fork tail shoulder, neck extension and the fork extension of the forked tail portion.
Figure 21:
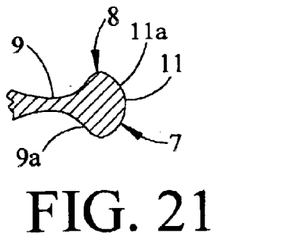
FIG. 21 is a sectional view taken along line 12—12 of the forked tail lure illustrated in FIG. 1 illustrating yet another alternative configuration for the fork tail shoulder, neck extension and the fork extension of the forked tail portion.
Figure 22:
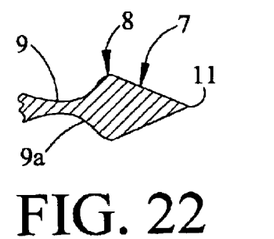
FIG. 22 is a sectional view taken along line 12—12 of the forked tail lure illustrated in FIG. 11 illustrating another alternative configuration for the fork tail shoulder, neck extension and the fork extension of the forked tail portion.
Figure 23:
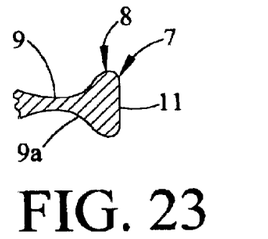
FIG. 23 is a sectional view taken along line 12—12 of the forked tail lure illustrated in FIG. 11 illustrating still another alternative configuration for the fork tail shoulder, neck extension and the fork extension of the forked tail portion.
Figure 24:
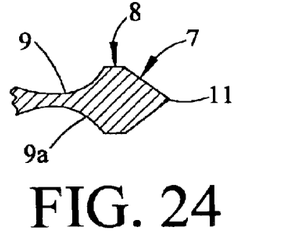
FIG. 24 is a sectional view taken along line 12—12 of the forked tail lure illustrated in FIG. 11 illustrating yet another alternative configuration for the fork tail shoulder, neck extension and the fork extension of the forked tail portion.

Referring now to FIGS. 7–12 of the drawings, the forked tail lure 1 is illustrated with forked tail necks 9 of varying thickness, as more particularly illustrated in FIGS. 8, 10 and 12, respectively, to facilitate a swimming action which is either more or less pronounced as to the degree of movement and vibration of the forked tail portion 7 for a selected speed of retrieval. For example, as illustrated in FIGS. 8 and 12 of the drawings, under circumstances where the forked tail neck 9 is relatively thin in cross-section (FIG. 8), side-to-side movement of the forked tail portion 7 in a simulated swimming action will be faster and very pronounced and will create more vibration in the forked tail portion 7 and generated in the forked tail lure body 5, than it would in a circumstance where the forked tail neck 9 is thicker, as indicated in FIG. 12, for a given speed of retrieval of the forked tail lure 1 through a water body. Additionally, the wider the fork tail shoulder 8, the slower the "wiggle" or oscillation and the wider the degree of oscillation or side-to-side movement of the forked tail portion 7 during retrieval of the forked tail lure 1. Moreover, the angle or slope of the neck extension or appendage 9a with respect to the longitudinal axis of the fork tail neck 9 also determines the speed and degree of oscillation of the forked tail portion 7. The speed and degree of "wiggle" or oscillation of the forked tail portion 7 illustrated in FIGS. 8, 10 and 12 resulting from the drag and eddy effect of the water pressure against the forked tail shoulder 8 and the degree of vibration in the forked tail lure body 5 for a selected retrieval speed is therefore a function of the flexibility and resiliency of the plastic material of construction, the thickness of the forked tail neck 9, and the extent of protrusion, size, shape and angle of the forked tail shoulder 8 of the forked tail lure 1. Various alternative shapes of the forked tail portion 7 are detailed in FIGS. 13–25 of the drawings.

Referring now to FIGS. 3–6 of the drawings, a block tail lure is generally illustrated by reference numeral 14 and includes a block tail lure body 20, shaped generally in the configuration of a minnow or bait fish and having a simulated caudal fin 2, anal fin 3 and pectoral fins 4. A block tail portion 15 is either molded integrally with or attached to the block tail body 20 as heretofore described with respect to the forked tail lure 1 illustrated in FIGS. 1 and 2, and the block tail portion 15 is characterized by a linear block tail shoulder 16 which extends transversely across the width of the block tail portion 15 without curvature, unlike the forked tail portion 7 illustrated in the forked tail lure 1. As further illustrated in FIGS. 4–6, the block tail shoulder 16 includes a block tail shoulder neck 17 of selected size and thickness and a block tail extension 18 that connects the block tail neck 17 to the block tail shoulder 16. The degree of curvature and the length of the block tail extension 18 may vary, along with the size and thickness of the block tail shoulder 16, to define a desired degree of vibration of the block tail portion 15 and the block tail body 20, for a selected speed of retrieval of the block tail lure 14. As further illustrated in FIGS. 5 and 6, it has been found that a block tail shoulder taper 19 in the rear extending edges of the block tail shoulder 16 further enhances the swimming action and the vibration of the block tail portion 15 and block tail body 20. As in the case of the forked tail lure 1 illustrated in FIGS. 1 and 2, a hook 6 can be inserted in the block tail lure body 20 for retrieval purposes, as heretofore described. Moreover, the speed and degree of side-to-side "wiggle" or oscillation of the block tail portion 15 and the vibration generated in the block tail body 20 at a selected retrieval speed is a function of the width of the block tail shoulder 16 and block tail neck 17, as well as the resiliency of the block tail neck 17 and the angle of the block tail shoulders 16 with respect to the longitudinal axis of the block tail neck 17.

Figures 25, 26:
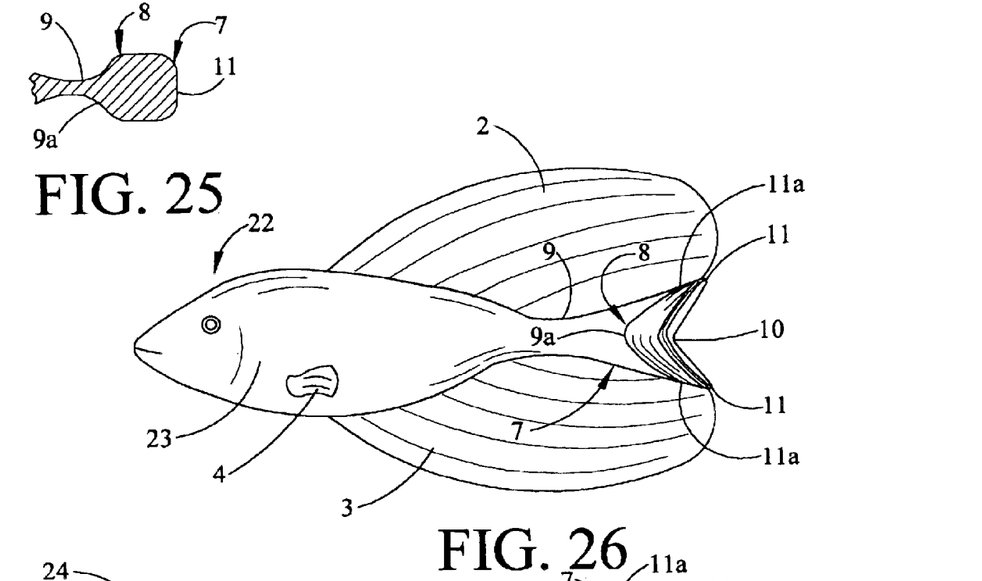
FIG. 25 is a sectional view taken along line 12—12 of the forked tail lure illustrated in FIG. 11 illustrating another alternative configuration for the fork tail shoulder, neck extension and the fork extension of the forked tail portion.
FIG. 26 is a side view of a thin fin lure having extended flexible, resilient, caudal and anal fins and fitted with a flexible, resilient forked tail portion as illustrated in FIGS. 1 and 7–25.

Referring now to FIG. 26 of the drawings, in another embodiment of the invention a flexible, resilient, typically plastic thin fin lure 22 is illustrated, with a thin fin lure body 23 that generally simulates a bait fish or minnow and a caudal fin 2 and anal fin 3 that are large, thin, resilient and flexible in order to undulate and "swim" as the thin fin lure 22 is retrieved through a water body. The caudal fin 2 and anal fin 3 typically extend from the thin fin lure body 23 rearwardly and are attached to a forked tail portion 7 at the top and bottom thereof. The forked tail portion 7 is typically characterized by a tail fork 10, defined by a forked tail shoulder 8 and including a curved neck extension or appendage 9a, along with fork extension curvatures 11a that extend the forked tail shoulder 8, to define the forked tail portion 7. Alternatively, it will be appreciated by those skilled in the art that a block tail portion 15 illustrated in FIGS. 3–6 may be substituted for the forked tail portion 7 to achieve an alternative swimming action and vibration in all portions of the thin fin lure 22.

Figure 27:
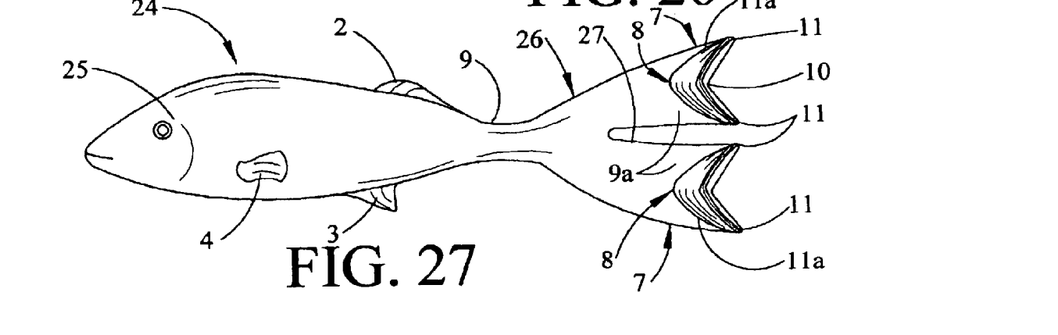
FIG. 27 is a side view of a dual vertical forked tail lure having a pair of flexible, resilient dual forked tail portions having configurations as illustrated in FIGS. 1 and 7–25.

Referring to FIG. 27 of the drawings, a dual vertical forked tail lure 24 is illustrated having a typically flexible, resilient, plastic dual forked tail lure body 25, connected to or integrally formed with a dual forked tail portion 26. As in the case of the lures illustrated heretofore, the dual forked tail portion 26 includes a pair of forked tail portions 7, connected to the dual forked tail lure body 25 by a forked tail neck 9 of selected thickness and length. The vertically-oriented forked tail portions 7 of the dual forked tail portion 26 are separated by a horizontal tail portion slot 27, and each includes a forked tail shoulder 8, defining the curved rear margin of a corresponding neck extension 9a and the curved front margin of a tail fork 10, and including a fork extension curvature 11a, extending from the forked tail shoulder 8 to define a pair of fork extensions 11 and the tail fork 10, as illustrated. Accordingly, as the dual vertical forked tail lure 24 is retrieved through a water body at a selected speed, both of the forked tail portions 7 of the dual forked tail portion 26 flutter, "swim", and vibrate as heretofore described with respect to the forked tail portions 7 illustrated in FIGS. 1, 2 and 7–25, and generate a corresponding "swimming" action in the dual forked tail lure body 25, to simulate the swimming action of a bait fish. In an alternative embodiment, the dual forked tail portion 26 in the vertical dual forked tail lure 24 can be replaced by dual block tail portions 15 (only one of which is included in the embodiments illustrated in FIGS. 3–6). Further in the alternative, a forked tail portion 7 can be combined with a block tail portion 15 in the dual vertical forked tail lure 24, as desired.

Figure 28:
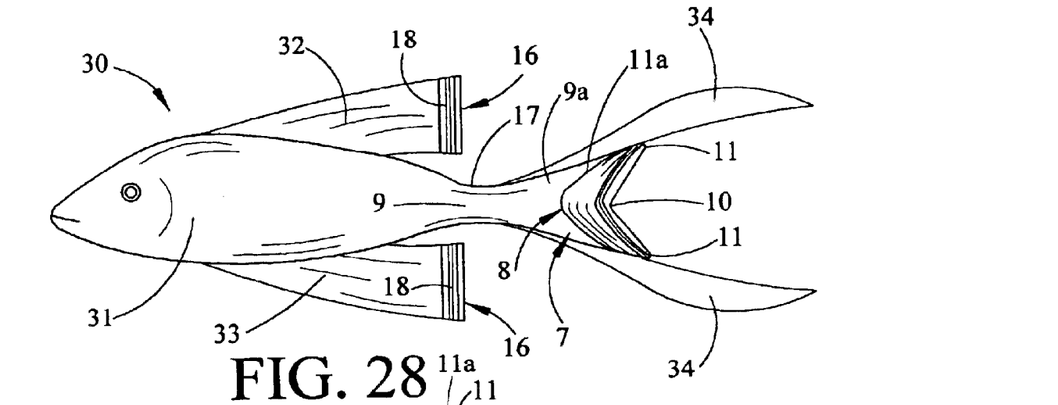
FIG. 28 is a side view of a dual block fin lure having flexible and resilient dorsal block fin and caudal block fins similar in design to the block tail portions illustrated in FIGS. 3–6 and also having a flexible, resilient forked tail portion as illustrated in FIGS. 1 and 7–25 and a pair of flexible and resilient streamer fins extending from the forked tail portion thereof.

Referring to FIG. 28 of the drawings, a dual block fin lure 30 is illustrated and is typically constructed of flexible, resilient, typically plastic material of suitable composition. The dual block fin lure 30 includes a dual block fin body 31, fitted with a simulated dorsal block fin 32 and a caudal block fin 33, each terminated at the ends thereof with a block tail shoulder 16, typically defined as heretofore described and as illustrated in FIGS. 3–6 of the drawings. Accordingly, each of the block tail shoulders 16 provided in the dorsal block fin 32 and the caudal block fin 33 includes a block tail neck extension 18, extending from the relatively flat, thin surface area of the flexible and resilient dorsal block fin 32 and the caudal block fin 33, respectively, to the block tail shoulder 16, as further illustrated in FIGS. 4–6 of the drawings, the dorsal block fin 32 and the caudal block fin 33 being similar in design to the block tail portion 15 in each of FIGS. 4–6. A pair of flexible, resilient streamer fins 34 may be extended from a forked tail portion 7, typically connected at a forked tail neck 9 to the dual block fin lure body 31 of the dual block fin 30, as further illustrated in FIG. 28. Furthermore, the forked tail portion 7 may typically include a neck extension or appendage 9a that extends from the forked neck 9 to the forked tail shoulder 8, and fork extensions 11 and fork extension curvatures 11a further define the curvature of the forked tail shoulder 8. Accordingly, when the dual block fin lure 30 is fitted with a hook 6 (FIGS. 1 and 2) and retrieved through a water body, the dorsal block fin 32, caudal block fin 33 and the forked tail portion 7, as well as the neck extension 9a and the dual block fin body 31, all undulate and "swim" from side-to-side, to further simulate the swimming of a bait fish through the water. It will be appreciated by those skilled in the art that alternatives in the dual block fin lure 30 are possible, such as by way of example, replacing each or either of the block tail shoulders 16 in the dorsal block fin 32 and the caudal block fin 33, respectively, with a forked tail portion 7 and replacing the single forked tail portion 7 with a block tail shoulder 16, or any combination of these tail portion configurations.

Figures 29, 30:
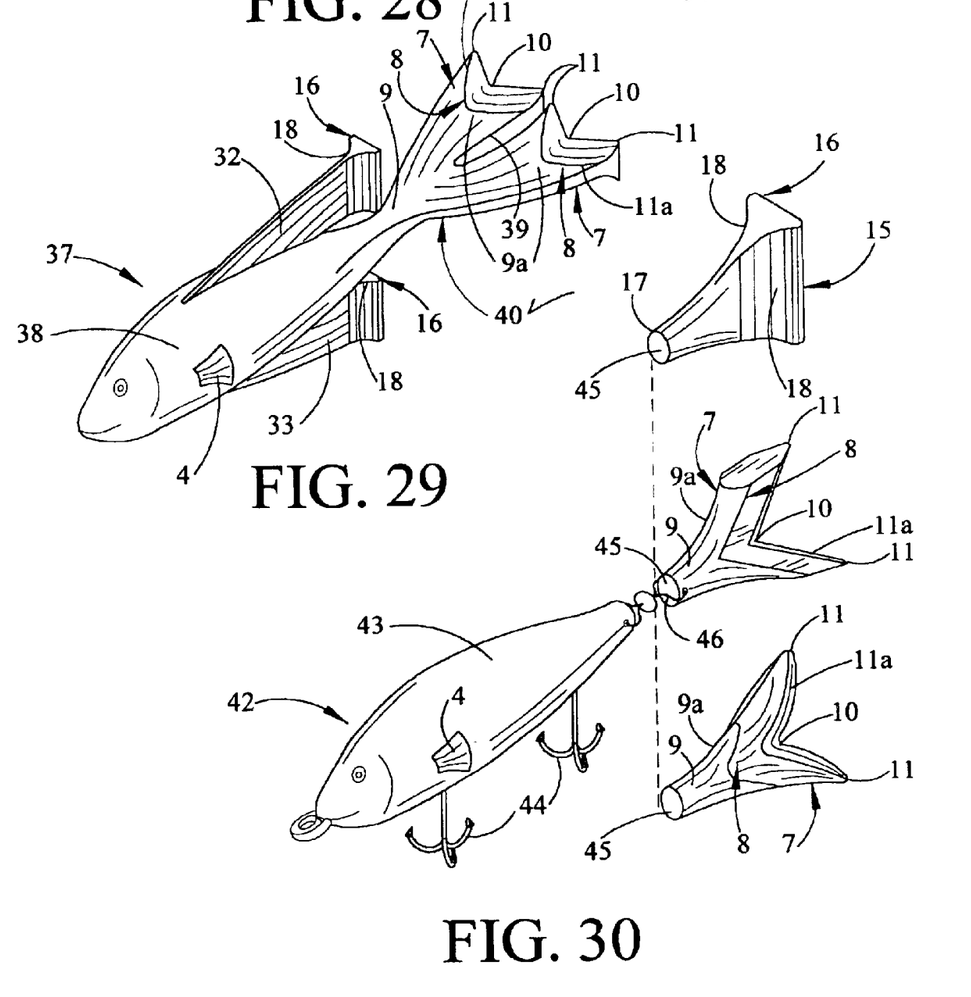
FIG. 29 is a front perspective view of a dual horizontal forked tail lure which is characterized by flexible and resilient dorsal and caudal block fins similar in design to the block tail portions as illustrated in FIGS. 3–6 and also having a pair of flexible and resilient forked tail portions separated by a slot and oriented substantially in the horizontal plane.
FIG. 30 is a perspective view of a removable tail lure having a soft or hard body portion and a typically flexible and resilient forked tail portion or a block tail portion connected to the body portion by means of a tail connector.

Referring to FIG. 29 of the drawings, a dual horizontal forked tail lure 37 is illustrated and is characterized by a typically flexible, resilient, plastic, dual horizontal forked tail lure body 38, shaped generally in the configuration of a minnow or small bait fish and having a dual horizontal forked tail portion 40, with simulated pectoral fins 4, a dorsal block fin 32 and a caudal block fin 33, the latter two fins of which are equipped with block tail shoulders 16, respectively. As in the case of the dual block fin lure 30 illustrated in FIG. 28, in the dual horizontal forked tail lure 37, both the dual block fin 32 and caudal block fin 33 are each characterized by a curved block tail neck extension 18 that extends from the expanse of the dorsal block fin 32 and the caudal block fin 33, respectively, to the extension of the block tail shoulder 16, as further illustrated in FIG. 29. The dual horizontal forked tail portion 40 of the dual horizontal forked tail lure 37 is resilient and flexible and connected to or formed integrally with the dual horizontal forked tail lure body 38 at a forked tail neck 9 of selected size and length and includes a pair of horizontal forked tail portions 7, separated by a tail portion slot 39 and each provided with a forked tail shoulder 8 that curves rearwardly to define fork extensions 11 along corresponding fork extension curvatures 11a. Accordingly, the dual horizontal forked tail lure 37 may be retrieved through a water body by means of a hook embedded therein, typically as illustrated in FIG. 1. The dorsal block fin 32 and caudal block fin 33 then vibrate and "swim" through a vertical plane, while the dual forked tail portions 7 of the dual horizontal forked tail portion 40 vibrate and "swim" through a horizontal plane, both planar vibrations effecting a vibration and simulated swimming action of the dual horizontal forked tail lure body 38. It is understood that the dual horizontal forked tail portion 40 can be replaced on the lure body 38 with a dual horizontal block tail portion (not illustrated), wherein a pair of block tail portions 15 (FIG. 3) instead of the forked tail portions 7, as illustrated, extend from the forked tail neck 9.

Referring now to FIG. 30 of the drawings, a removable tail lure 42 is illustrated, having either a hard or soft plastic, removable tail lure body 43 with optional simulated pectoral fins 4 and typically fitted with treble hooks 44. A flexible, resilient, typically plastic forked tail portion 7 is attached to the removable tail lure body 43 at a forked tail neck 9 by means of a tail connector 46 such as wire, a pair of screw-eyes or other connection known to those skilled in the art, to facilitate "swimming" movement of the forked tail portion 7, as well as the removable tail lure body 43, as the removable tail lure 42 is retrieved through a water body. Alternative forked tail portions 7 can be attached to the removable tail lure body 43 by simply removing and re-attaching the tail connector 46. It will be appreciated that the selection of the tail portion element of the lure can include the block tail portion 15 illustrated in the block tail lure 14 shown in FIGS. 3–6 of the drawings, as well as other tail configurations, including the forked tail portion 7 configurations illustrated in FIGS. 1, 2 and 7–25.

Figures 31, 32:
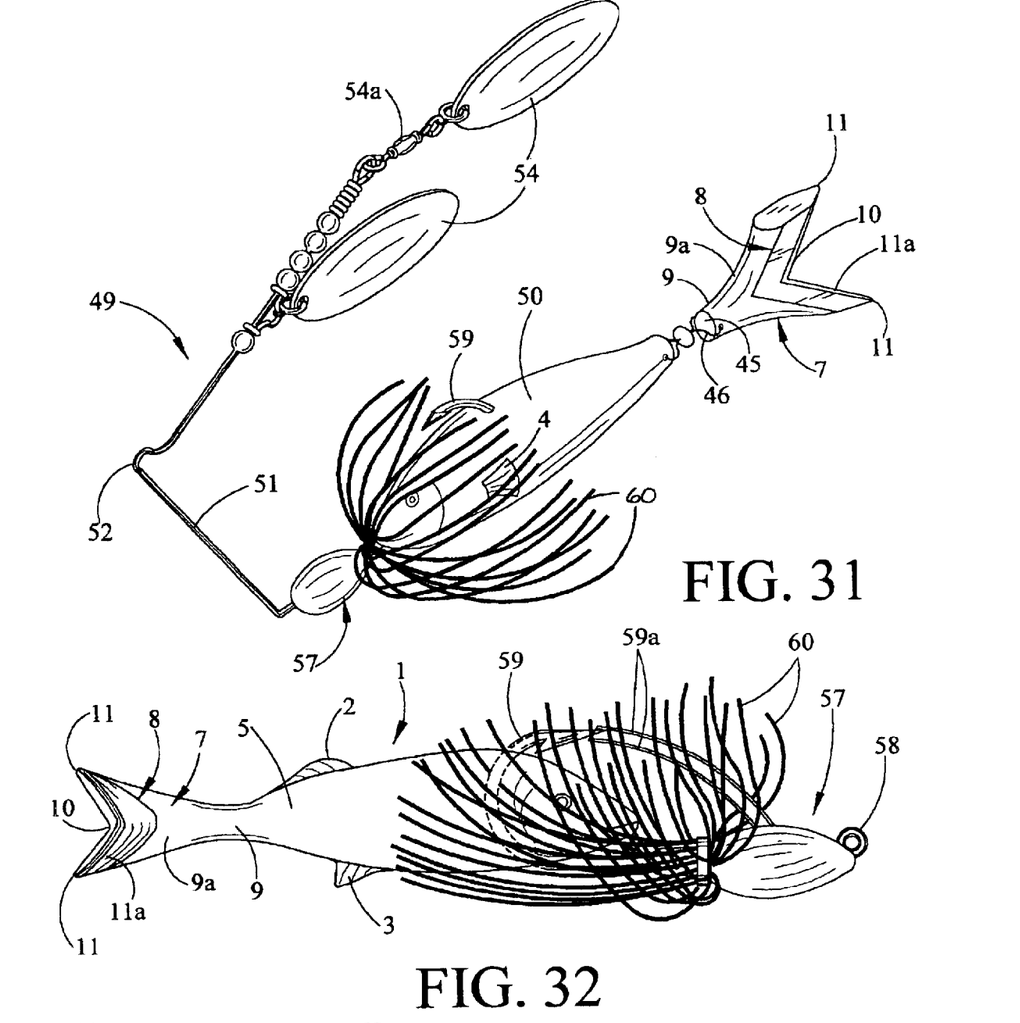
FIG. 31 is a perspective view of a spinner bait lure having a soft body portion impaled on a jig head hook, which jig head hook is molded on a wire harness having spinners, in conventional fashion and which soft body portion is fitted with a flexible and resilient forked tail portion connected to the body portion by means of a tail connector.
FIG. 32 is a side view of a jig head, the hook of which is impaled in a flexible, resilient forked tail lure body, typically having a forked tail portion of the design illustrated in FIGS. 1 and 7–25.

Referring to FIG. 31 of the drawings, a spinner bait lure 49 is illustrated which may be generally the same design as the removable tail lure 42 without the treble hooks and thus, may include a removable flexible, resilient, typically plastic forked tail portion 7, which is attached to the spinner bait lure body 50, fitted with a wire harness 51 attached to a jig head 57. The wire harness 51 is typically conventional in design and has a harness bend 52 for attachment to a fishing line and retrieval of the spinner bait lure 49 through a water body, wherein the forked tail portion 7 "swims" and vibrates, thus generating a corresponding simulated swimming of the spinner bait lure body 50 and a pulsating action of the skirt 60. Alternatively, a modified jig head 57a, typically as illustrated in FIG. 33, may be fixed to the wire harness 51 and a lure such as the forked tail lure 1, block tail lure 14, thin fin lure 22, dual block fin lure 30 or the dual horizontal forked tail lure 37, as well as any other selected lure having a tail portion design of this invention, may be attached to the jig head hook 59 of the jig head 57a, as desired, with similar simulated swimming results.

Referring now to the jig head 57 illustrated in FIG. 32, the jig head 57 is characterized by a jig head eye 58 for attachment to a retrieving line (not illustrated) and a jig head hook 59 is embedded in the typically lead or other metallic jig head 57 and extends outwardly from the rear of the jig head 57, typically oriented upwardly and forwardly, where it may optionally be engaged by a weed guard 59a, also extending from the jig head 57. A jig head skirt 60 is characteristically further attached to the jig head 57 or to the jig head hook 59, where it joins the jig head 57 to conceal the jig head hook 59. A resilient, flexible, typically plastic lure such as the forked tail lure 1, block tail lure 14, thin fin lure 22, dual block fin lure 30, dual horizontal forked tail lure 37 or other lure detailed herein may be impaled on the jig head hook 59 as indicated in FIG. 32 and the combination of the jig head 57 and the typically forked tail lure 1 illustrated in FIG. 32 may be retrieved, with the flexible, resilient forked tail portion 7 and the forked tail lure body 5 undulating and swimming and the jig head skirt pulsating in a life-like manner in the water body.

Figure 33:
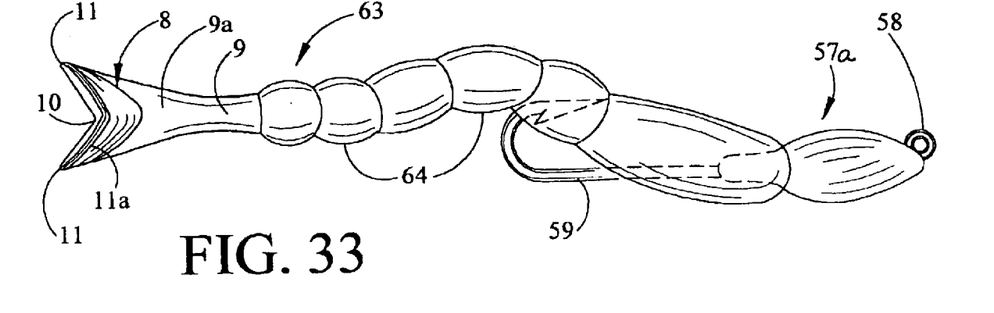
FIG. 33 is a side view of an alternative jig head fitted with a flexible, resilient beaded worm body, typically terminating in a flexible, resilient forked tail portion illustrated in FIGS. 1 and 7–25.

Referring now to FIG. 33 of the drawings, a flexible, resilient, typically plastic beaded worm body 63 may be attached to a modified jig head 57a generally in the same manner as the forked tail lure 1 illustrated in FIG. 32, except that the tip of the jig head hook 59 is reinserted in the beaded worm body 63 rearwardly of the head thereof, to render the lure weedless. The beaded worm body 63 may be provided with a desired number of integral body beads 64 to define a beaded worm body 63 of selected length. The beaded worm body 63 is typically terminated by a flexible, resilient forked tail portion 7, which operates in the same manner as the forked tail portion 7 illustrated in FIGS. 1, 2 and 7–25 as heretofore described, to impart a life-like swimming action, accentuated by the flexible beaded worm body 63, to the modified jig head 57.

Figure 34:
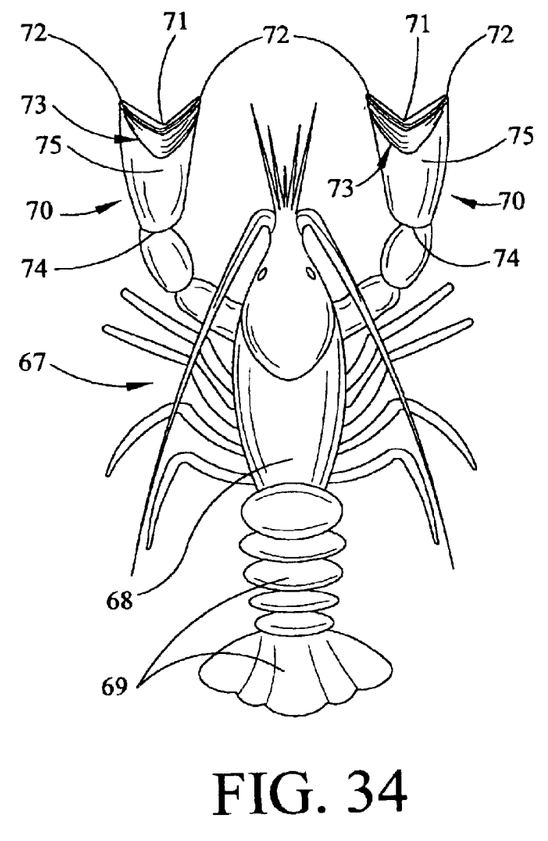
FIG. 34 is a top view of a hard body or flexible, resilient crawfish lure having a pair of flexible, resilient forked claws, which forked claws are typically designed in similar fashion to the forked tail portions as illustrated in FIGS. 1 and 7–25.

Referring to FIG. 34 of the drawings, a crawfish lure is generally represented by reference numeral 67 and typically includes a flexible, resilient crawfish lure body 68 configured generally in the shape of a crawfish and having a crawfish lure tail 69 extending therefrom. A pair of flexible, resilient forked claws 70 project as appendages from the crawfish lure body 68 and are each terminated by a claw fork shoulder 73, defined by a pair of claw forked neck extensions or appendages 75, each extending from a curved claw fork neck 74 in each of the forked claws 70. Claw fork extensions 72 extend from the claw fork shoulder 73 to define a claw fork 71, and the entire forked claw 70 design may be the same as the forked tail portions detailed in applicant's FIGS. 1, 2 and 7–25. Alternatively, it will be appreciated by those skilled in the art that each of the claw shoulders 73 may be designed in the same manner as the block tail shoulder 16 illustrated in FIGS. 2–6. In use, the crawfish lure 67 is normally attached to a hook (not illustrated) that is typically embedded in the crawfish lure tail 69 or the crawfish lure body 68, such that the crawfish lure 67 is retrieved rearwardly, thus allowing the flexible, resilient forked claws 70, as well as the crawfish lure body 68 and the crawfish lure tail 69, to vibrate and "swim" in the same manner as the forked tail lure 1 illustrated in FIGS. 1, 2 and 7–25.

Figure 35:
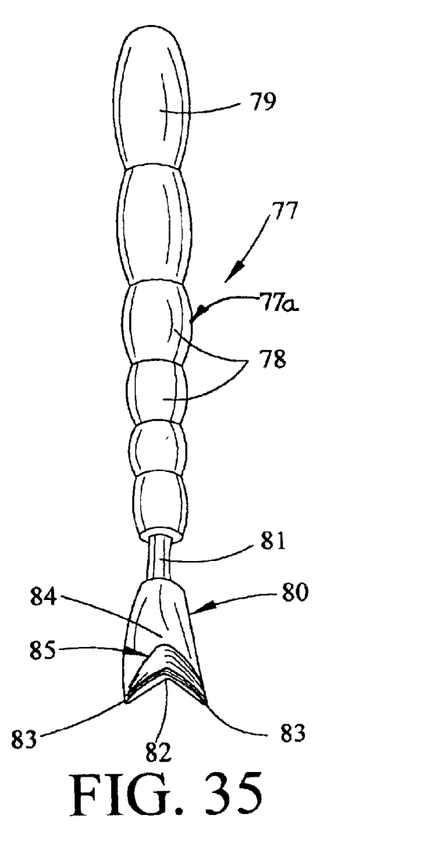
FIG. 35 is a top view of a segmented worm lure which is characterized by an elongated, flexible, resilient worm body fitted with a tail connector and a flexible and resilient segmented worm lure forked tail portion or appendage, typically having the same design as the forked tail portion illustrated in FIGS. 1 and 7–25.

Referring to FIG. 35 of the drawings, a flexible, resilient, typically plastic segmented worm lure 77 is illustrated, having multiple worm segments 78 of desired size and number extending from a worm head 79 to a smaller tail connector 81. A flexible, resilient, typically plastic segmented worm lure tail portion 80 is connected to the tail connector 81 and typically includes a segmented worm lure tail shoulder 85, designed in essentially the same manner as the fork tail shoulder 8 of the fork tail portion 7 of the forked tail lure illustrated in FIGS. 1, 2 and 7–25. A worm lure tail fork extension 83 extends from the segmented worm lure tail shoulder 85 at each end of a worm tail fork 82, and a worm lure tail extension 84 extends from the tail connector 81 to define the enlarged segmented worm lure tail shoulder 85, as further illustrated in FIG. 35. In use, the worm head 79 is typically embedded on a hook such as a hook 6 illustrated in FIG. 1 or the jig head hooks 57 and 57a, illustrated in FIGS. 32 and 33, respectively, to facilitate attachment of a retrieval line (not illustrated) and as the segmented worm lure 77 is retrieved through a water body at a selected speed, the segmented worm lure tail portion 80 vibrates and "swims" in the same manner as the forked tail portion 7 of the forked tail lure 1 illustrated in FIGS. 1, 2 and 7–25, but with an accentuated vibration that transfers energy to, and extends along the length of the worm body 77a, due to the flexible tail connector 81, to attract fish. Alternatively, it will be appreciated that the segmented worm lure tail portion 80 may be replaced by a block tail portion 15 illustrated in FIGS. 3–6 to achieve a similar composite "swimming" function.

Figure 36:
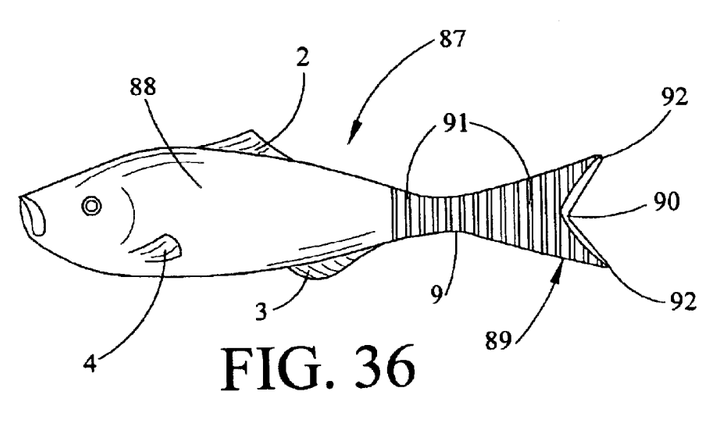
FIG. 36 is a side view of a multiple shoulder forked tail lure having a body portion and multiple, flexible, resilient shoulders on a flexible, resilient tail portion, such as the forked tail portion of the forked tail lures illustrated in FIGS. 1 and 7–25 or the block tail portion of in the block tail lures illustrated in FIGS. 3–6.

Referring to FIG. 36 of the drawings, a multiple shoulder forked tail lure 87 is illustrated, having a typically, flexible, resilient multiple shoulder forked tail lure body 88, shaped generally in the configuration of a minnow or small bait fish with a simulated caudal fin 2 and anal fins 3, as well as pectoral fins 4, and further including a flexible, resilient, typically plastic multiple shoulder tail portion 89, provided with multiple transverse shoulder forked tail portion shoulders 91. Typically, the forked tail portion shoulders 91 are aligned in substantially parallel relationship with respect to each other across the forked tail neck 9 of the multiple shoulder tail portion 89. A multiple shoulder tail portion fork 90 is provided in the extreme rear end of the multiple shoulder tail portion 89 and extends outwardly to define a pair of multiple shoulder tail portion fork extensions 92, as illustrated. The projecting multiple tail portions shoulders 91 serve to create a multiple drag and eddy effect in the multiple shoulder tail portion 89 and cause the multiple shoulder tail portion 89 to vibrate and "swim" and the multiple shoulder forked tail lure body 88 to also "swim", when the lure is retrieved.

Figure 37:
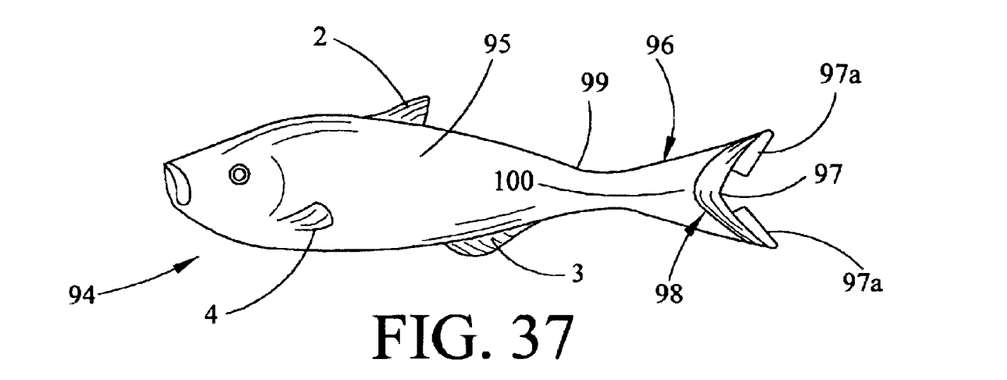
FIG. 37 is a slotted tail lure having a flexible, resilient, slotted tail portion fitted with projecting slot extensions for exhibiting a swimming action.

Referring now to FIG. 37 of the drawings, a slotted tail lure 94 is provided and has a typically flexible, resilient, plastic slotted tail lure body 95 with a simulated caudal fin 2, anal fin 3 and pectoral fins 4. A flexible, resilient, plastic slotted tail portion 96 is attached or shaped integrally with the slotted tail lure body 95 at a slotted tail neck 99 of selected thickness and length and includes a slotted tail shoulder 98, defined by a slotted tail neck extension 100 that projects from the slotted tail neck 99 rearwardly of the slotted tail lure body 95. A tail slot 97 is provided adjacent to the slotted tail shoulder 98 and defines a pair of slot extensions 97a, to facilitate a unique vibrating function of the slotted tail portion 96, which generates a corresponding vibration in the slotted tail lure body 95, when the slotted tail lure 94 is attached to a hook or a jig head such as the hook 6 illustrated in FIG. 1 or the jig head hook 57 and 57a, illustrated in FIGS. 32 and 33, respectively, and the slotted tail lure 94 is retrieved through a water body at a selected speed.

Figure 38:
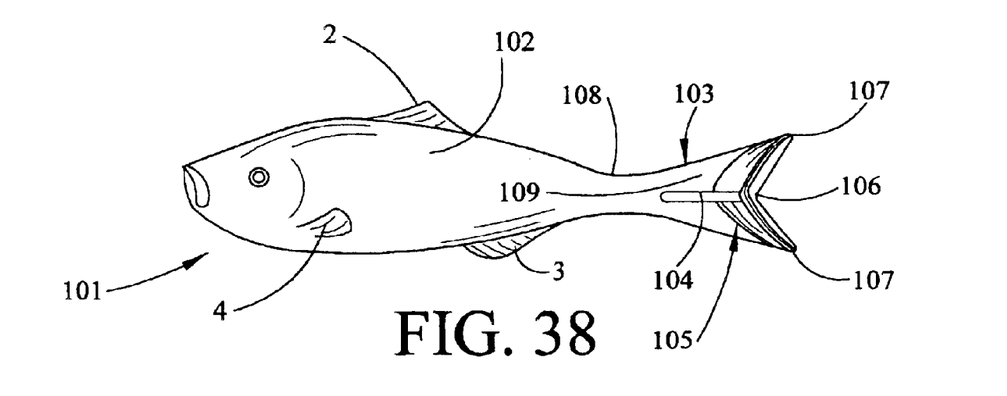
FIG. 38 is a grooved tail lure having a body portion and a flexible, resilient grooved tail portion having a tail groove on both sides thereof through the grooved tail shoulder portion, thus enhancing the swimming action.

Referring to FIG. 38 of the drawings, in another embodiment of the invention, a grooved tail lure 101 is detailed and includes a flexible, resilient grooved tail lure body 102 which is characteristically manufactured of a soft plastic material. A typically soft plastic, grooved tail portion 103 is either formed integrally with or attached to a grooved tail neck 108 that extends from the grooved tail lure body 102, and a grooved tail neck extension appendage or 109 of the grooved tail neck 108 is characterized by a tail groove 104 that extends through a grooved tail shoulder 105 on each side of the grooved tail portion 103. A grooved tail fork 106 is provided in the grooved tail portion 103 and extends bidirectionally to define a pair of grooved tail fork extensions 107, as further illustrated in FIG. 38. Accordingly, attachment of the grooved tail 101 to a hook such as the hook 6 illustrated in FIGS. 1 and 2 and the jig head hook 57 and 57a illustrated in FIGS. 32 and 33, respectively, facilitates "swimming" of the grooved tail lure 101 and the grooved tail lure body 102 through the water, and vibration of the grooved tail portion 103 simulates the "swimming" action.

It will be appreciated by those skilled in the art that the various tail portions, tail portion combinations and appendages described above with respect to applicant's drawings can be used with variations of either the forked tail portion 7, block tail portion 15, dual forked tail portion 26 and various other combinations described above, to facilitate the objective of effecting a hard body or flexible fishing lure that is able to "swim" through the water and vibrate at various retrieval speeds to closely simulate a "swimming" lizard, worm, crawfish, grub, minnow, tube bait and the like. Furthermore, these lures can be impaled on hooks of various design and attached to jig heads such as the jig head 57 and modified jig head 57a and fitted with a harness, as in the case of the spinner bait lure 49. Various other hook combinations and jig head combinations and the like known to those skilled in the art can be used in connection with the flexible fishing lure tails and appendages of this invention.

It will be further appreciated by those skilled in the art from a consideration of the drawings that the various tail and appendage neck areas can be varied in size and length, along with the size, shape and angle of the respective projecting shoulder pairs to create a vibration of selected proportions in all portions or segments of the lures, at any selected speed of retrieval of the lures through the water body. As described above, this total lure vibration is more pronounced in the thinner the tail or appendage neck and the more pronounced the shoulder projections at a selected retrieval speed. Furthermore, the respective body portions of the lures of this invention to which the tail vibration is imparted, can be constructed of hard plastic, wood, fiberglass and other materials, as well as molded of soft, flexible, resilient plastic materials of suitable composition, according to the knowledge of those skilled in the art. Since the vibration and "swimming" action of these respective tail and appendage assemblies depends upon the drag and eddy principle, that is, the shoulder causing drag in the water and the sloped rear shape or angle of the shoulder creating an eddy behind the tail portion, the shape of the respective neck and shoulder projections is also a factor in controlling the degree of vibration of the tail assembly and thus, the body portions, for any given speed of retrieval.

It has further been found that the forward projecting edges of each of the shoulders described above must be round rather than squared off, in order to create the desired lure "swimming" action. The rear edges of the shoulders for example, at the respective forked extensions may be square, but the forward edge elements of the shoulders should always be rounded.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A fishing lure comprising: a lure body; a flexible tail neck extending from said lure body; a flexible forked tail portion extending from said flexible tail neck, said flexible forked tail portion having opposite, substantially symmetrical side surface and opposite, substantially symmetrical tail edges, said forked tail portion further comprising an upper fork extension, a lower fork extension and a central portion therebetween, said upper fork extension and said lower fork extension diverging from said central portion wherein said lure body and said forked tail portion each taper toward said tail neck, respectively, from a front and a rear of said tail neck; and a single rounded, solid, continuous and unbroken shoulder provided in each of said side surfaces of said flexible forked tail portion, said single rounded, solid, continuous and unbroken shoulder extending from said flexible tail neck to said tail edges of said flexible forked tail portion, and said single, rounded, solid, continuous and unbroken shoulder extending outwardly transverse to a longitudinal axis of said fishing lure from said upper fork extension, and downwardly and forwardly to said central portion, and then downwardly and rearwardly to the lower fork extension from said central portion on each of said side surfaces, said single shoulder having a convex shape throughout its entirety and said flexible forked tail portion being free of any grooves or pockets extending into said forked tail portion in a rearward direction along the axis of the fishing lure, for imparting vibration and a simulated swimming action to said flexible forked tail portion and said lure body responsive to retrieval of said fishing lure through a body of water.

2. A method for inducing vibration and a simulated swimming action in a flexible fishing lure, said method comprising the step of:

providing a fishing lure comprising:
 a lure body;
a flexible tail neck extending from said lure body; a flexible forked tail portion extending from said flexible tail neck, said flexible forked tail portion having opposite, substantially symmetrical side surfaces and opposite, substantially symmetrical tail edges, said forked tail portion further comprising an upper fork extension and a lower fork extension, and a central portion therebetween, said upper fork extension and said lower fork extension diverging from said central portion, wherein said lure body and forked tail portion each taper toward said tail neck, respectively, from a front and rear of said tail neck; and a single rounded, solid, continuous and unbroken shoulder provided in each of said side surfaces of said flexible forked tail portion, said single rounded, solid, continuous and unbroken shoulder extending from said flexible tail neck to said tail edges of said flexible forked tail portion, and said single, rounded, solid, continuous and unbroken shoulder extending outwardly transverse to a longitudinal axis of said fishing lure from said upper fork extension and downwardly and forwardly to said central portion, and then downwardly and rearwardly to the lower fork extension from said central portion on each of said side surfaces, said single shoulder having a convex shape throughout its entirety and said flexible forked tail portion being free of any grooves or pockets extending into said forked tail portion in a rearward direction along the axis of the fishing lure, for imparting vibration and a simulated swimming action to said flexible forked tail portion and said lure body responsive to retrieval of said fishing lure through a body of water.

* * * * *